United States Patent [19]

Parl

[11] Patent Number: 5,526,168
[45] Date of Patent: Jun. 11, 1996

[54] LIGHT BEAM DEFLECTION MEANS

[75] Inventor: Ulrich Parl, Raisdorf, Germany

[73] Assignee: Linotype-Hell AG, Eschborn, Germany

[21] Appl. No.: 500,400

[22] Filed: Jul. 11, 1995

Related U.S. Application Data

[63] Continuation of Ser. No. 64,062, Oct. 21, 1993, abandoned.

[30] Foreign Application Priority Data

Sep. 18, 1991 [DE] Germany .......................... 41 30 977.4

[51] Int. Cl.$^6$ .................................................. G02B 26/08
[52] U.S. Cl. ........................ 359/226; 359/632; 359/214; 359/220
[58] Field of Search .................................. 359/632, 635, 359/638, 212, 213, 214, 220, 273, 226

[56] References Cited

U.S. PATENT DOCUMENTS 4,413,180 11/1983 Libby ...................................... 359/220

FOREIGN PATENT DOCUMENTS

| 0185592 | 6/1986 | European Pat. Off. ......... H04N 3/09 |
| 0390641 | 10/1990 | European Pat. Off. ........ G02B 26/08 |
| 4070805 | 3/1992 | Japan ..................................... 359/212 |

OTHER PUBLICATIONS

Patent Abstracts of Japan, Jun. 28, 1988, Nakamura Kunio, "Polygon Mirror".
Patent Abstracts of Japan, May 24, 1990, Kabeuchi Teruo et al, "Polygon Mirror".

*Primary Examiner*—Georgia Y. Epps
*Assistant Examiner*—Thomas Robbins
*Attorney, Agent, or Firm*—Hill, Steadman & Simpson

[57] ABSTRACT

The system deflects an optical beam and is composed of at least one prism. The prism is provided with at least one reflection face and is rotationally seated with respect to a rotational axis. In order to achieve high speeds, at least regions of the prism are provided with an outside contour designed essentially rounded.

11 Claims, 3 Drawing Sheets

LIGHT BEAM DEFLECTION MEANS

This is a continuation of application Ser. No. 08/064,062, filed Oct. 21, 1993, now abandoned.

BACKGROUND OF THE INVENTION

The invention relates to the field of reproduction technology and is directed to a device for the deflection of an optical beam, said device being composed of at least one prism that is provided with at least one reflection face and is rotationally seated with respect to a rotational axis.

Light beam deflection devices are employed, for example, in scanner elements for originals scanner devices or in recording elements for recording devices.

In an originals scanner device, also referred to as an input scanner, a light beam generated in a scanner element is conducted point-by-point and line-by-line across an original to be scanned, and the scan light reflected from or transmitted through the original is converted into an image signal in an optoelectronic transducer. In a recording device, also referred to as a recorder, an exposer or an output scanner, the light beam acquired in a recording element is intensity modulated by an image signal for recording information and is conducted point-by-point and line-by-line across a light-sensitive recording material.

In the case of a flat bed apparatus, the holder for the original or for the recording material is a planar surface over which the light beam is conducted point-by-point and line-by-line, and that moves relative to the scanner element or the recording element. In the case of an inside drum apparatus, the holder for the original or for the recording material is designed as a stationary half-shell or trough. The scanner element or recording element moves parallel to the longitudinal axis of the halfshell or trough, and the light beam is conducted radially across the original or the recording material perpendicularly relative to the longitudinal axis.

DE-C-39 18 075 discloses such a light beam deflection means having a prism. An incident light beam here is first introduced into the prism via a light entry face and is inwardly reflected in the region of an exit face. Another reflection occurs at a further limiting face, and the light beam is refracted upon exit of the light beam from the prism. The prism has an asymmetrical mass distribution with respect to the rotational axis which, due to the flying forces arising upon rotation of the light beam deflection means, only allows a limited speed range. Over and above this, considerable air turbulences that can cause noise and contamination occur at higher speeds as a consequence of a shaping that is asymmetrical with respect to the rotational axis.

Another light beam deflection means comprising a prism is disclosed by U.S. Pat. No. 4,878,720. Here, too, the prism has a shaping as well as a mass distribution with respect to the rotational axis which lead to considerable, asymmetrical centrifugal forces as well as to a creation of noise.

SUMMARY OF THE INVENTION

It is therefore an object of the present invention to improve a device of the type initially cited such that operation at high speeds is guaranteed.

This object is inventively achieved in that the prism is provided with an outside contour designed essentially rounded at least in regions thereof.

This rounded design makes it possible to allow the apparatus to rotate with a high speed, without creating significant air turbulences. Such air turbulences and air striations, namely, can deteriorate the transmission of the optical light beam in the prism. Over and above this, the rounded contour of the device avoids the creation of loud noises.

Given an arrangement that is symmetrical with respect to a rotational axis, it is also possible to achieve a uniform mass distribution that reduces dynamic loads at high speeds. In particular, vibrations and beats that result from resonant effects can thereby also be avoided.

It is provided in a preferred embodiment of the invention that the prism is designed as a sphere segment. Particularly given an arrangement of the sphere segment such that radii of curvature that are symmetrical with respect to the rotational axis are present, an extremely uniform rotation of the prism can be guaranteed, this, in particular, also avoiding contamination of the prism due to suspended particles that are contained in the air flowing around the prism.

It is provided in another preferred embodiment of the invention that the prism designed as a sphere segment is arranged having its reflection face facing toward a support that is essentially designed as a hemisphere. As a result of such a design, the manufacture of the prism is simplified and a freely prescribable orientation of the reflection face in the region of a transition of the prism to the support is enabled.

It is provided in another embodiment of the invention that the prism is provided with a flattened portion in the region of its light entry face. The size of this flattened portion can be matched to the beam diameter of the optical beam that charges the prism. In addition to a planar design of the entry face, it is also possible, for example, to provide an inwardly arced entry face. 10 Further details of the present invention derive from the following, detailed description and from the attached drawings wherein preferred embodiments of the invention are illustrated by way of example.

DESCRIPTION OF THE PREFERRED EMBODIMENTS

Figure 1:
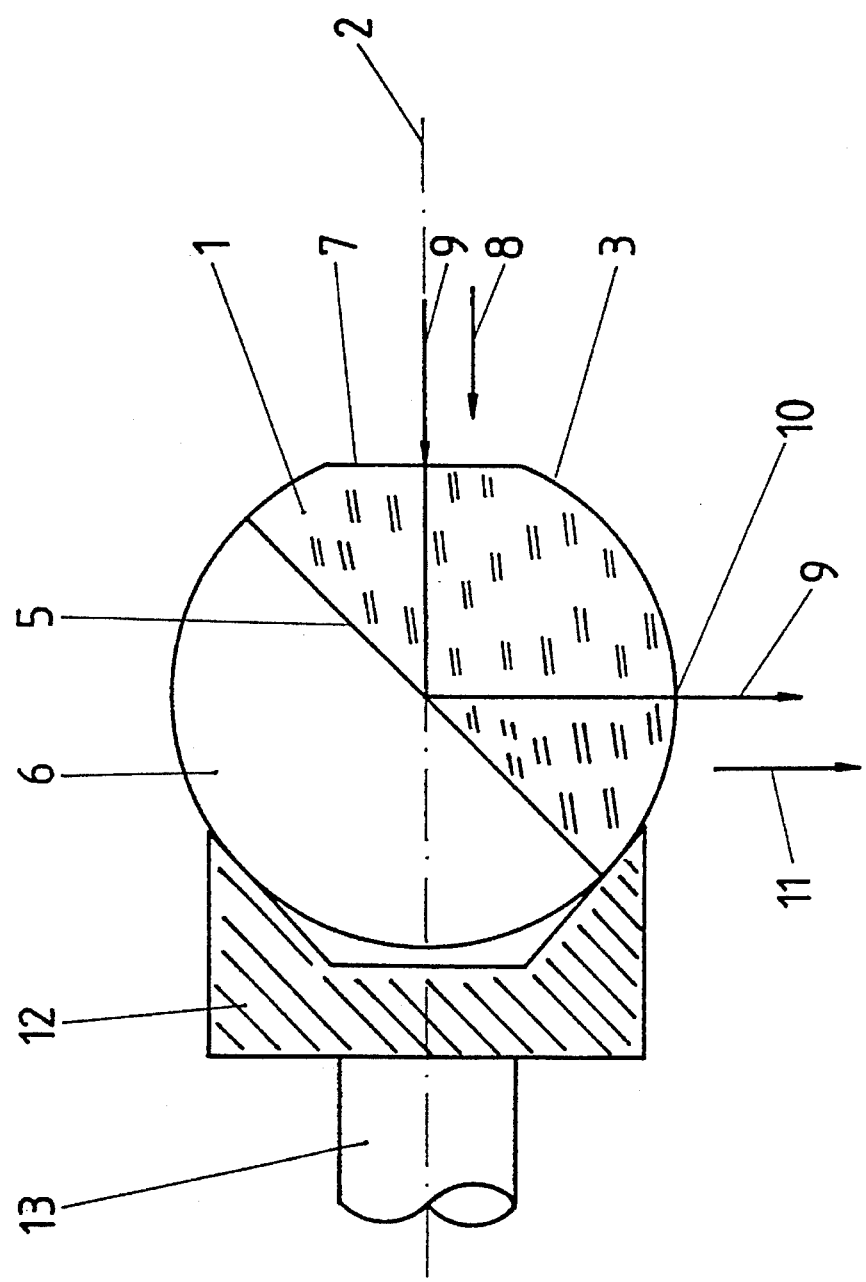
FIG. 1 is a partially cut side view of an apparatus wherein the prism is designed as a sphere segment that is arranged in the region of an essentially hemispherical support.

FIG. 1 shows a partially cut side view of an apparatus for deflecting an optical beam that is essentially formed of a prism (1) that is rotationally seated with respect to a rotational axis (2) and is provided with an outside contour (3) rounded at least in regions thereof. In the embodiment of FIG. 1, the prism (1) is designed as a sphere segment that is provided with a reflection face (5). The reflection face (5) is arranged in the region of a limitation of the prism (1) facing toward a support (6). In the region of its expanse facing away from the reflection face (5), the prism (1) comprises an entry face (7) that extends essentially perpendicularly, relative to an entry direction (8) of the optical beam (9). Said entry face having a radius substantially smaller than a radius of said sphere shown in FIG. 1.

The reflection face (5) is arranged inclined relative to the entry direction (8). In particular, it has been envisioned to provide an angle of inclination of approximately 45°. As a result thereof, the optical beam (9) is reflected relative to the entry direction (8) with an angle of approximately 90° and leaves the prism (1) in an exit direction (11) through a light exit face (10). The light exit face (10) is essentially arcuately designed.

The support (6) is essentially hemispherically design and supplements the prism (1) with respect to the rotational axis (2) to form a dynamically balanced member. Particularly when the support (6) and the prism (1) are designed of materials having an identical specific weight, a symmetrical mass distribution can thereby be realized. Given employment of different materials, at least an identical coefficient of thermal expansion is expedient in order to avoid shearing forces in the region of a transition, for example, a gluing, that connects the prism (1) to the support (6).

Regions of the support (6) are surrounded by a holder (12) that comprises an essentially cup-shaped design. In the region of its expanse facing away from the support (6), the mount (12) is connected to a shaft (13) that connects the mount (12) to a rotational drive which is not shown.

In addition to design the prism (1) as a sphere segment, it is also fundamentally conceivable to provide other rounded designs. In particular, it is possible, for example, to provide a design corresponding to a cylindrical segment with respect to the rotational axis (2), and to undertake a supplementation of the cylindrical contour with the support (6). Over and above this, it is also possible to design the mount (12) and the support (6) of a uniform material and, for example, of one piece.

Figure 2:
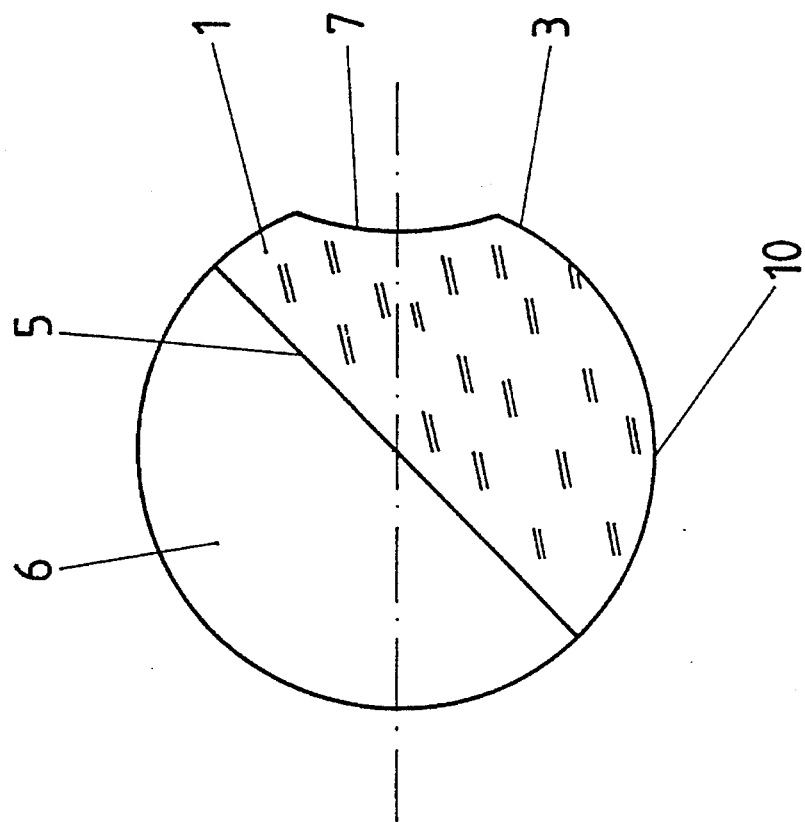
FIG. 2 is a longitudinal section through a prism designed as a sphere segment that is provided with an inwardly arced light entry face.

In the embodiment of FIG. 2, the light entry face (7) is provided with an inside curvature. This makes it possible to generate a lens effect that compensates the lens effect caused by the arced design of the light exit face, (10) or causes a prescribable beam focusing in common with a lens effect. Instead of an arcuate light entry face (7), it is also possible to arrange a separate lens in the region of an essentially planar light entry face (7). It is possible to realize high speeds due to the rounded design of the outside contour (3) and, in particular, given a design of the prism (1) as a sphere segment. For matching the temperature coefficients of the support (6) and of the prism (1), it is particularly conceivable to manufacture the support (6) of a ceramic or of a specific alloy of metal. Given dsign of the support (6) of a material identical with the material of the prism (1), the reflection face (5) can, for example, be provided with a dielectric reflection layer. Given design of the prism (1) and of the support (6) of different materials, the reflection properties resulting from the material transition can be employed for realizing the reflection face (5).

Figure 3:
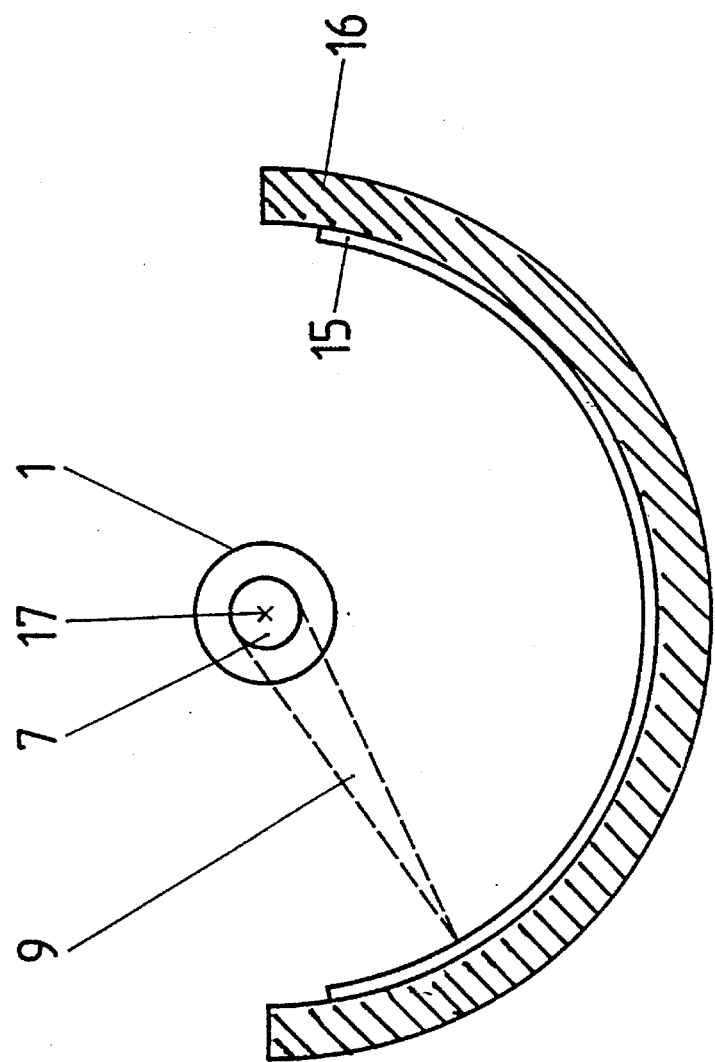
FIG. 3 is an applied example of the light beam deflection means.

FIG. 3 shows an applied example of the light beam deflection means of the invention in a scanner means of a recording apparatus designed according to the inside drum principle. Given such an inside drum recorder or exposer, the recording material (15) is secured to the inside wall of a holder (16) shaped like a half-shell or like a cylindrical segment. The scanner means rotates around the longitudinal axis (17) of the half-shell or of the cylindrical segment. The scanner means comprises the light beam deflection means shown and described in FIG. 1.

Although various minor changes and modifications might be proposed by those skilled in the art, it will be understood that I wish to include within the claims of the patent warranted hereon all such changes and modifications as reasonably come within my contribution to the art.

I claim:

1. A device for deflecting an optical beam, comprising:
   a hemispherical prism having a light entry face and a light exit face;
   a hemispherical support having a same radius as the hemispherical prism and directly abutting the hemispherical prism at a reflection face formed by planar surfaces of the support and prism, the hemispherical support and hemispherical prism forming in combination a sphere;
   a rotatable mount connected to said sphere for rotating said sphere about a rotational axis passing through said light entry face, said rotational axis also being an optical axis for an optical beam entering said hemispherical prism at said light entry face;
   said light entry face having a radius perpendicular to said rotational axis which is substantially smaller than a radius of said sphere; and
   said reflection face being arranged transversely with respect to said optical axis to reflect said optical beam such that the reflected beam passes through said light exit face.

2. A device according to claim 1 wherein the light entry face of said hemispherical prism is flat.

3. A device according to claim 18 wherein said light entry face of said hemispherical prism has a curvature extending inwardly towards said reflection face.

4. A device according to claim 1 wherein said reflection face is arranged with an angle of 45° with respect to said rotational axis and said optical beam entering the light entry face, and said reflection face being oriented relative to said rotational axis such that an exit beam passing through said light exit face exits in a direction perpendicular to said rotational axis and to said optical axis.

5. A device according to claim 1 wherein said rotatable mount is substantially cup-shaped and has two sides, one side of the mount being connected to said sphere and the opposite side being connected to a rotatable shaft.

6. A device according to claim 1 wherein said mount and said hemispherical support of said sphere being formed of a same material.

7. A device according to claim 28 wherein said hemispherical prism and combined hemispherical support have same coefficients of thermal expansion.

8. A device according to claim 1 wherein a lens is arranged in a region of said light entry face of said hemispherical prism.

9. A device according to claim 1 wherein the hemispherical support and hemispherical prism are formed of materials having an identical specific weight so that a symmetrical mass distribution of said sphere occurs about said rotational axis.

10. A device for deflecting an optical beam, comprising:
    a hemispherical prism having a light entry face and a light exit face;
    a hemispherical support having a same radius as the hemispherical prism and directly abutting the hemispherical prism at a reflection face, the hemispherical support and hemispherical prism forming in combination a sphere;

a rotatable mount connected to said sphere for rotating said sphere about a rotational axis passing through said light entry face, said rotational axis also being an optical axis for an optical beam entering said hemispherical prism at said light entry face; and;

said reflection face being arranged transversely with respect to said optical axis to reflect said optical beam such that the reflected beam passes through said light exit face.

11. A device according to claim 10 wherein an entire flat planar face of said hemispherical support is directly abutting with an entire flat planar face of said hemispherical prism so as to form said reflection face along the entire direct abutment of the two flat planar faces.

* * * * *